(12) United States Patent
Putt et al.

(10) Patent No.: US 6,443,258 B1
(45) Date of Patent: Sep. 3, 2002

(54) DURABLE POROUS ARTICLE OF MANUFACTURE AND A PROCESS TO CREATE SAME

(75) Inventors: Dean L. Putt, Lititz; Marsha Stalker Bischel; Anthony L. Wiker, both of Lancaster; Andrea M. Moser, Millersville, all of PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 09/662,985

(22) Filed: Sep. 15, 2000

Related U.S. Application Data (60) Provisional application No. 60/157,269, filed on Oct. 1, 1999, provisional application No. 60/157,301, filed on Oct. 1, 1999, provisional application No. 60/179,367, filed on Jan. 31, 2000, provisional application No. 60/179,385, filed on Jan. 31, 2000, and provisional application No. 60/179,420, filed on Jan. 31, 2000.

(51) Int. Cl.$^7$ .................................................. E04B 1/84
(52) U.S. Cl. ..................... 181/294; 181/286; 428/703
(58) Field of Search ................................. 181/284, 285, 181/286, 287, 290, 292, 293, 294, 295; 428/703, 220, 294.7, 312.4, 312.2, 310.5, 318.6; 106/122, 713; 521/83, 100; 264/42, 45.3, 50

(56) References Cited

U.S. PATENT DOCUMENTS

| | | |
|---|---|---|
| 3,444,956 A | 5/1969 | Gaffney |
| 3,542,640 A | 11/1970 | Friedberg et al. |
| 3,819,388 A | 6/1974 | Cornwell |
| 3,871,952 A | 3/1975 | Robertson |
| 4,042,745 A | 8/1977 | Cornwell et al. |
| 4,488,932 A | 12/1984 | Eber et al. |
| 4,551,384 A | 11/1985 | Aston et al. |
| 4,613,627 A | 9/1986 | Sherman et al. |
| 4,636,444 A | 1/1987 | Lombardozzi |
| 4,702,870 A | 10/1987 | Setterholm et al. |
| 4,899,498 A | 2/1990 | Grieb |
| 5,085,929 A | 2/1992 | Bruce et al. |
| 5,109,030 A  * | 4/1992 | Chao et al. ................... 521/83 |
| 5,250,578 A | 10/1993 | Cornwell |
| 5,277,762 A | 1/1994 | Felegi, Jr. et al. |
| 5,395,438 A | 3/1995 | Baig et al. |
| 5,612,385 A | 3/1997 | Ceaser et al. |
| 5,641,584 A  * | 6/1997 | Andersen et al. ........... 428/703 |
| 5,720,851 A | 2/1998 | Reiner |
| 5,824,148 A | 10/1998 | Cornwell |

* cited by examiner

*Primary Examiner*—Khanh Dang
(74) *Attorney, Agent, or Firm*—Womble Carlyle Sandridge & Rice, PLLC (57) ABSTRACT

An acoustically absorbent porous panel formed from a cured aqueous foamed cementitious material comprising on a wet basis of about 53% to about 68% by weight cement, about 17% to about 48% by weight water, about 0.05% to about 5% by weight fiber, and about 0.01% to about 10% by weight surfactant. The panel also has pores distributed within the cured material comprising about 75% to about 95% by volume of the material. The cement-based, foamed panel provides good acoustical performance with enhanced durability and moisture resistance.

60 Claims, 6 Drawing Sheets

Figure 1

PRIOR ART

Figure 2

PRIOR ART

DURABLE POROUS ARTICLE OF MANUFACTURE AND A PROCESS TO CREATE SAME

This application claims the benefit of U.S. Provisional Application Nos. 60/157,269 and 60/157,301, each filed Oct. 1, 1999; and U.S. Provisional Application Nos. 60/179,367, 60/179,385, and 60/179,420, each filed Jan. 31, 2000.

FIELD OF THE INVENTION

The present invention relates to the field of building materials, and more particularly to acoustical panels for walls, ceilings, movable partitions and other interior surfaces in commercial and residential construction. These are porous materials designed for acoustic absorbency.

BACKGROUND OF THE INVENTION

Acoustical panels for walls and ceilings provide sound absorption, aesthetics, and separate utility space in ceilings. Manufacturers strive to develop decorative acoustical ceiling panels at the lowest possible cost by continuously refining the manufacturing process in an effort to reduce energy use, materials costs and waste. While cost reduction is important, there is an inherent limit to how much the process can be simplified and still produce a panel that meets the requirements of acoustical performance, moisture resistance, and fire resistance.

Typical wallboard manufacturing begins with gypsum that is mined and crushed as gypsum rock or obtained synthetically from flu gas desulfurization plants. In the calcination process, the powdered gypsum is heated to dehydrate the gypsum to a hemihydrate. The calcined gypsum or hemihydrate is known as stucco. Fillers such as perlite and fiberglass are added to the stucco to achieve the desired properties of the finished wallboard. Other additives include starch to help adhere the core to the paper face. Retarders and accelerators may be added to adjust the reaction rate. These ingredients are combined with water and soap foam in a high speed or pin mixer. Although soap foam is added to lower the core density, the resulting structure may not have sufficient porosity to be considered acoustic. The resulting mixture is placed between two sheets of paper and sized for thickness by a roller. After the core sets up, the board is cut to length then transferred to an oven to dry.

Current methods of producing acoustical ceiling panels utilize various combinations of fibers, fillers, binders, water and surfactants mixed into a slurry which is processed into panels. This process is very similar to the methods used in papermaking. Examples of fibers used may include mineral fiber, fiberglass, and cellulosic material. Mineral wool is a lightweight, vitreous, silica-based material spun into a fibrous structure similar to fiberglass and may also be used. Mineral wool enhances acoustical performance, fire resistance, and sag resistance of an acoustic panel.

Fillers may include expanded perlite and clay. Expanded perlite reduces material density and clay enhances fire resistance of the acoustical panel. Examples of binders used in acoustical panels may include starch, latex and/or reconstituted paper products, which link together and create a binding system that locks all of the ingredients into a structural matrix.

The above ingredients, when combined and processed appropriately, produce a porous, sound absorbent panel suitable for use as acoustic ceiling panels and other types of construction panels. Today, such panels are manufactured using a high volume process that resembles paper production.

Traditional fabrication methods of forming panels incorporating a mineral wool fiber, perlite filler and cellulosic binders, rely upon aggregation and flocculation of the cellulosic ingredients. The resulting aqueous cellular foam is dried to provide a stable structure within which fiber, binders and fillers flocculate and bond to create a matrix. While an aqueous cellular foam mixture may include a surfactant to facilitate the entrainment of air into the mixture the traditional methods of fabrication rely upon flocculation. The structure of a typical ceiling panel material is shown in the 30×photomicrograph of FIG. 1. The perlite particles are discernable as round nodules embedded in an interconnecting matrix of mineral wool and reconstituted newsprint fibers.

Current processes for manufacturing ceiling panels are complex, include many steps, and use large amounts of water and energy. During the process, water is progressively removed from the product through a combination of draining, pressing, and high-temperature oven heating. Some drained water may be recycled, but a majority is treated and released into the environment.

Different production processes and slurry recipes yield panels with differing acoustical and structural characteristics. There is a tradeoff between the acoustical performance and the durability. A highly porous, low-density material may exhibit the best acoustical performance. Unfortunately, a low-density material tends to be fragile and difficult to handle and exhibits low durability, low scrubability, and low tensile strength. For the purpose of this disclosure, the term durability refers to a panel's compressive yield strength which is a measure of how easily panel material deforms under compression. Resistance to finger indentation is an example of good compressive yield strength. Scrubability is the resistance to abrasion by repeated back and forth motion of a wet scrub brush. Tensile strength refers to the ability to lift or support a panel along one edge without the panel breaking.

Figure 2:
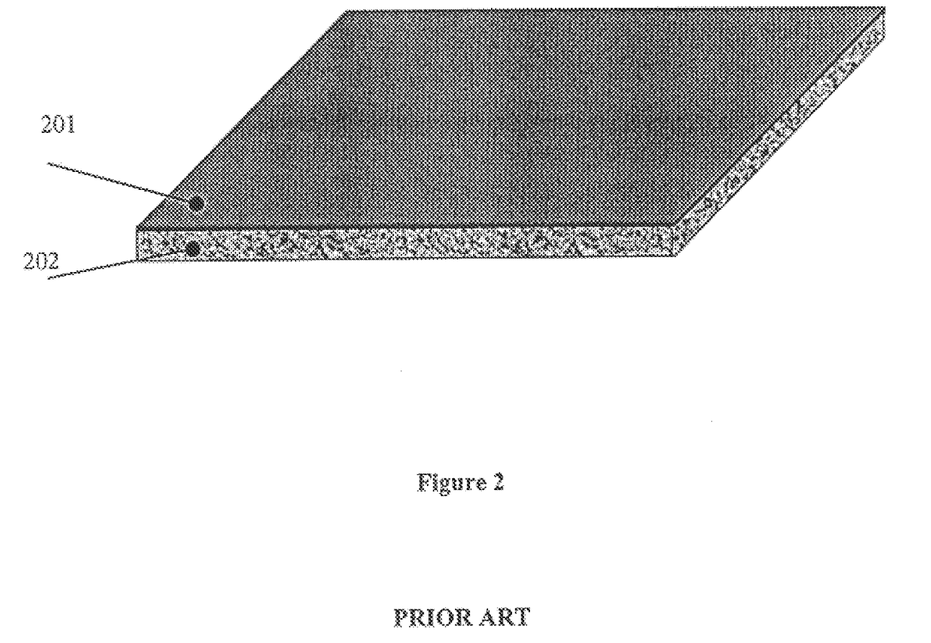
FIG. 2 is a schematic, perspective representation of a laminate-based acoustic panel made in accordance with the prior art.

Various processes and recipes are used to balance the tradeoffs inherent in the manufacture of acoustical ceiling panels. For example, one common structure for a ceiling panel is a laminate, using different layers of material, as shown in FIG. 2. One layer 201 comprises a soft, acoustically absorbent material, while the other layer 202, which faces into the room, is a more durable, sometimes structural material that is relatively transparent to sound. The acoustical performance of the panel is largely a function of the inner layer 201, while the outer layer 202 enhances the durability, scrubability, and aesthetics. The outer layer 202 in FIG. 2 may be a third-party supplied material. Normally, an adhesive attaches the overlay 202 to the inner layer 201. Other steps involved in the manufacture of laminated panels include painting, cutting to size, and packaging.

Laminated panels provide a good balance between performance and durability. Such panels have the advantage of being susceptible to continuous manufacturing processing in certain steps, but require additional process steps and additional materials, e.g. the outer layer material and adhesive, which are not required when producing a homogeneous panel. Furthermore, the outer layer material usually is a high-cost constituent and the lamination process requires additional machinery, materials, and human resources. While the production of the acoustical material 201 component can typically be done in continuous fashion, the lamination step is not a continuous process. As a result, laminated panels are relatively expensive to manufacture.

Figure 1:
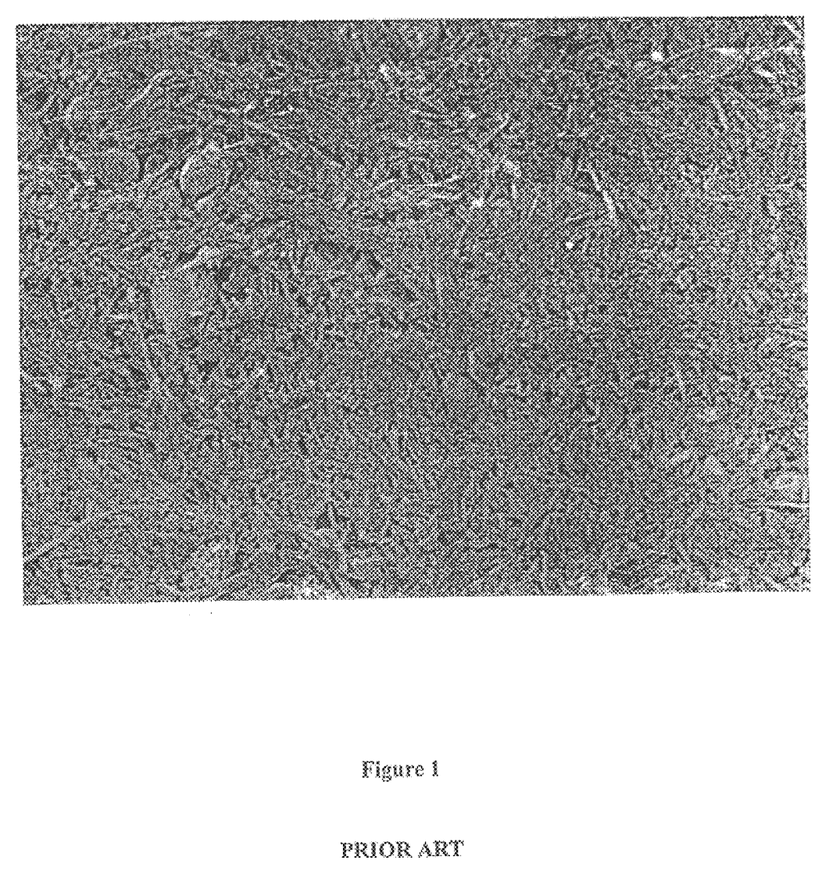
FIG. 1 is 30×photomicrograph of a mineral wool-based material made in accordance with the prior art.

Casting or molding processes are also used to create a panel structure as in FIG. 1. Casting produces a homogeneous material that is very durable and has good acoustical properties. Cast materials generally have a much higher density, and do not require the additional layer present in laminated construction. Casting is essentially a batch process in which the material is poured into a mold. The bottom of the mold is typically lined with a carrier or release agent to prevent sticking. The materials are dried in the mold, the mold is removed, and the panel undergoes a finishing process. Molded panels usually have good mechanical strength properties and exhibit good durability but the acoustical performance is generally not as good as a laminated panel. Drawbacks to the molding process include: the requirement of moving molds continuously throughout the process, smaller panels resulting from mold size constraints; the requirement of the added step of panel removal from the molds; and higher material cost per panel because of increased panel density.

Another common method of producing a panel having the structure shown in FIG. 1 is to extrude the slurry onto a wire belt, and allow the water to drain from the slurry. Other process steps include forming, drying, and surfacing or sanding resulting panels to create the desired texture in a nearly continuous process to produce an acoustically absorbent layer. Process steps such as embossing or punching small holes into the material may further enhance the acoustical absorbency of the panel. Disadvantages include higher energy costs for drying and the treating of discharge water.

With the foregoing problems in mind, there is a need to produce a low-density material for use in ceiling and other structural panels having good acoustical performance, while maintaining structural durability of the material.

Additionally, there is a need to produce a panel with high sag resistance, improved durability, a high Noise Reduction Coefficient (NRC) and a high Sound Transmission Coefficient (STC).

A common method of producing a panel having high STC is to apply a backing material such as foil or an organic coating to the backside of the acoustic panel. The application of backing materials adds additional processing steps and cost to the finished product.

Furthermore there is a need to create a panel that does not require additional additives to enhance fire resistance and to create a non-homogeneous panel with a hard, high-density surface on at least one side.

SUMMARY OF THE INVENTION

The acoustically absorbent porous panels of the present invention are comprised of a cured aqueous foamed cementitious material wherein the resulting panel is comprised of at least 90% by weight of cementitious material. Additionally, the aqueous foamed cementitious material is comprised on a wet basis of about 53% to about 68% by weight cement, about 17% to about 48% by weight water, about 0.05% to about 5% weight fiber, and about 0.01% to about 10% weight surfactant. The panel further includes pores distributed within the cured material comprising about 75% to about 95% by volume of the panel.

Additionally, the present invention includes an acoustically absorbent porous panel where the resulting panel is comprised of at least 90% by weight of the cementitious material. The foamed cementitious material is comprised on a wet basis about 54% to about 63% by weight cement, about 32% to about 44% by weight water, about 0.1% to about 3% by weight fiber, and about 0.5% to about 5% by weight surfactant with pores distributed within the cured material comprising about 75% to about 95% by volume of the material.

The present invention includes an acoustically absorbent porous panel where the resulting panel is comprised of about 95% by weight of the cementitious material. The foamed cementitious material is comprised on a wet basis about 56% to about 61% by weight cement, about 32% to about 42% by weight water, about 0.28% to about 1.3% by weight fiber, and about 0.7% to about 2% by weight surfactant with pores distributed within the cured material comprising about 75% to about 95% by volume of the material.

Furthermore, the present invention includes a process for producing the acoustically absorbent porous panel. Within the process a foam slurry comprising between about 53% to about 68% by weight cement, between about 17% to about 48% by weight water, between about 1% to about 10% by weight calcium silicate, between about 0.05% to about 5% by weight synthetic organic fibers and between about 0.01% to about 10% by weight surfactant is aerated or whipped to include air within the slurry. The aerated foamed slurry is then dried to a moisture content of less than about 5% by weight water.

The present invention can also be characterized as an acoustically absorbent porous panel formed from cementitious material, fibers and surfactant. Wherein the formed panel has a density between about 10 and 40 $lb/ft^3$ and an indent of less than 0.12 inches. The formed panel also has a Noise Reduction Coefficient of at least 0.5, an STC between and including 30 and 40, and a sag test result of less than 0.150 inches at 90% RH.

These and other features of the present invention will become more apparent upon review of the following description, when taken in conjunction with the accompanying drawings.

DETAILED DESCRIPTION

The present invention comprises a foamed cementitious material for use in forming acoustically absorbent porous panels, such as ceiling panels. The formulation of the foamed cementitious material in uncured, wet weight percentages may include about 53% to about 68% cement; about 17% to about 48% water; about 0.05% to about 5% fibers; and about 0.01% to about 10% surfactant. The fibers may be synthetic organic fibers, such as those formed from polyesters.

Other formulations for the foamed cementitious material in uncured, wet weight percentages may include about 54% to about 61% cement; about 32% to about 44% water; about 0.1% to about 3% fibers; and about 0.5% to about 5% surfactant. Additionally, the foamed cementitious material in uncured, wet weight percentages may include about 56% to about 61% cement; about 32% to about 42% water; about 0.28% to about 1.3% fibers; and about 0.7% to about 2% surfactant.

Two specific embodiments of the invention which were made include:

| | |
|---|---|
| Portland cement | 59.8 wt. % |
| Water | 35.7 wt. % |
| Disodium laureth sulfosuccinate surfactant | 0.9 wt. % |
| Polyester fiber | 0.6 wt. % |
| Wollastonite | 3.0 wt. % |
| Gypsum | 60.7 wt. % |
| Water | 37.9 wt. % |
| Polyester fiber | 0.8 wt. % |
| Ethoxylated alkyl phenol surfactant | 0.6 wt. % |

In an embodiment, the formulation can further include certain additives to increase the hardness, ease of handling, and resistance to indention or impact damage of the panel. Examples of additives that may contribute to the overall hardness of a foamed cement generally includes calcium compounds or silica which is typically added in amounts of about 1% to about 10% by weight. Examples of calcium-based hardeners may include calcium oxide, calcium hydroxide, and carbonates. Silica additives may also include sodium silicate, mica, finely ground sand, and certain ashes high in silica such as rice hull ash and fly ash. Silicates can give a certain hardness to the panels that is typically measured by a scratch resistance test. This scratch resistance test is used to determine the surface integrity of the formed panels and is rated on a scale of 10 to 25, wherein the higher value indicates a more scratch resistant surface.

Scratch Resistance Test

The test consists of "raking" various thicknesses of "feeler" gauge (spring steel) stock across the face or edge of a ceiling tile or panel. The measure is the highest "feeler" gauge thickness (in thousandths of an inch) that does not damage the test material. The metal tongues or fingers are securely arranged evenly in a row and each has a protruding length of approximately 1.875 inches. The thickness of the tongues increases from one end of the row to the other end. The tongue thicknesses are 10, 12, 14, 16, 18, 20, 22, and 25 mils with corresponding increase in stiffness. The sample is placed in a holder below the set of tongues with the sample flange lower than the cutout forming the flange. The tongues are allowed to overlap across the top edge of the sample with the bottom of the tongue a distance of approximately 7/32 inches below the surface of the sample in the cutout forming the flange. The tongues are then drawn across the sample at a speed of 20 inches per minute. The thicker tongues will cause a scratch more easily and damage the edge more easily than the thinner tongues.

In the present invention the panels have a scratch resistance test value of about 12 or greater. When the surface of the panel is coated with an organic coating, such as paint, the value is typically at least 16 and can be as great as at least 22 when two coats of paint are applied to the panel. Typically, the panels average between about 12 and 14 for the uncoated panel and between about 16 to 18 for a panel with a single coat of paint.

Additionally, hardness can be determined as a function of compression resistance as set forth in ASTM C 367. The test was modified by the use of a 1-inch ball, 30-lbs force and a cross head speed of ½ inch/min. In the present invention the panels typically have a compression resistance or indent of less than 0.12 inches. In an alternative embodiment the compression resistance can be less than 0.1 inches and in a second alternative embodiment the compression resistance can be less than 0.08 inches.

Acoustical absorption by the panels is a function of sound energy that is both reflected in part and absorbed in part. Absorption usually takes place in either of two ways, transmission through the panels or conversion of the acoustic energy into heat by the panel material. The amount of sound energy absorbed by a material is determined by a standardized test procedure ASTM C423-90a entitled "Standard Test Method for Sound Absorption and Sound Absorption Coefficients by the Reverberation Room Method". Tests having STC results are determined by an insertion loss as set forth in ASTM E 90.

Absorption is expressed as the ratio of the sound energy absorbed to the sound energy incident to the panel surface. This ratio is called the absorption coefficient, usually denoted as A. The more sound energy absorbed, the closer this coefficient is to 1.0. Thus, when A=0, no sound energy is absorbed and all incident sound energy is reflected. Conversely, when A=1.0, all the sound energy is absorbed and none of the incident energy is reflected. The sound absorbing properties of materials vary with frequency and with transmission loss data. Sound absorption data is stated as a function of ⅓ octave frequency bands for 100 Hz to 5000 Hz. Sound absorption data is often combined into a single number called the Noise Reduction Coefficient which is obtained from the average value of A at 250, 500, 1000 and 2000 Hz rounded to the nearest multiple of 0.05. The higher the NRC value, the greater the average sound absorption in this frequency range.

The acoustically absorbent porous panels have a Noise Reduction Coefficient of at least 0.5. In an additional embodiment, the panels have a NRC of at least 0.6 and in a further embodiment the panels have a NRC of at least 0.7.

The foamed porous cementitious material may include most any cement, including, but not limited to a hydraulic cement, such as portland cement, sorrel cement, slag cement, fly ash cement, calcium alumina cement, calcium sulfate alpha hemihydrate or calcium sulfate beta hemihydrate, natural, synthetic or chemically modified calcium sulfate beta hemihydrate, as well as mixtures of the above-referenced cement ingredients or any mixture of the above-referenced cements. For example, a mixture of calcium alumina cement and portland cement may provide a faster set time to the porous cementitious composition. The calcium silicate component of the material may be selected from the commercial types known as wollastonite or Orleans One.

The fibers added to the foamed cementitious material may be added as essentially straight fibers having no purposeful bend in the strand. In the alternative, the fibers may be crimped, wherein the fibers have added bends such as in a zigzag configuration. In addition to polyester fibers, the fibrous material may include fiberglass or mineral wool. Other fibers may also include polyolefin and polyamide materials for increasing the modulus of elasticity of the resulting material.

Surfactants for use in the invention may include, but are not limited to, amphoteric, anionic, and nonionic moieties with a hydrophobic molecular portion containing 8 to 20 carbons. Such surfactants may be based on coconut oils such as cocamidopropyl betaine, cocamidopropyl hydroxysultaine, and cocoamphopropionate. Anionic moieties include sodium salts of a sulfoxal functional group such as sulfate or sulfosuccinate. For example, such anionic moieties may include alkyl benzene sulfonate, sodium lauryl ether sulfate, disodium cocamide diethyl amine, disodium cocamido methylethyl amine sulfosuccinate, disodium cocamido methyl isopropyl amine, sulfosuccinate, disodium deceth-6 sulfosuccinate, disodium dimethicone copolyol sulfosuccinate, disodium laureth sulfosuccinate, and disodium nonxynol-10 sulfosuccinate. Nonionic surfactants include moieties of ethoxylate and amine oxide such as, ethoxylated alkyl phenol, cocoamine oxide, lauramine oxide, myristamine oxide, oleamine oxide, and cocamidopropylamine oxide. One preferred surfactant for portland cement is disodium laureth sulfosuccinate, but the selection of the optimum surfactant is dependent on the nature of the cement used.

In an alternative formulation of the cementitious foamed material, alpha gypsum, such as calcium sulfate alpha hemihydrate, may be substituted for the cement. For the purposes of foaming when using alpha gypsum, the desired surfactant is an ethoxylated alkyl phenol with a hydrophobic molecular portion containing 8 to 13 carbons. This nonionic surfactant produces optimal particle suspension properties for gypsum.

The foamed material can be made by combining both a dry mix and an aqueous mix to form a foamed cementitious material. The dry mixture can be prepared by combining cement (such as portland), calcium silicate, and fibers (such as polyethylene terephthalate (PET) in the amounts previously disclosed. The fibers can have nominal lengths of about 0.25 inches to 0.75 inches with about 0.5 inches preferred and with about 0.0005 inches to about 0.007 inches in diameter. The dry mixture ingredients are combined in a dry mixing apparatus and mixed until the fibers and calcium silicates are completely dispersed. The aqueous mixture is created separately and includes water and a surfactant, such as disodium laureth sulfosuccinate. The aqueous components are mixed to create a diluted surfactant solution. Additionally, the aqueous components are typically mixed and aerated or foamed at temperatures between about 41° F. to about 168° F. In an alternative embodiment the diluted surfactant solution can be mixed at temperatures between about 58° F. to about 142° F. or between about 68° F. to about 92° F.

The diluted surfactant solution is either combined with the dry mixture and air in a two-stage mixing process or the diluted surfactant solution can be aerated prior to mixing with the dry mixture. A high-shear stage mixing entrains air to create a foamed composition, and also disperses the ingredients. In a next step, a low-shear mixing process ensures uniform dispersal of the fibers. The ingredients, by weight in the mixture may vary. Mixing entrains air to create a foam cementitious slurry and evenly dispersed throughout. The foamed slurry is deposited into a mold having a desired shape and thickness and then allowed to harden. Once hardened and dried, a relatively low-density cementitious material is formed with the fibrous and other components locked into a stable matrix.

Figure 4:
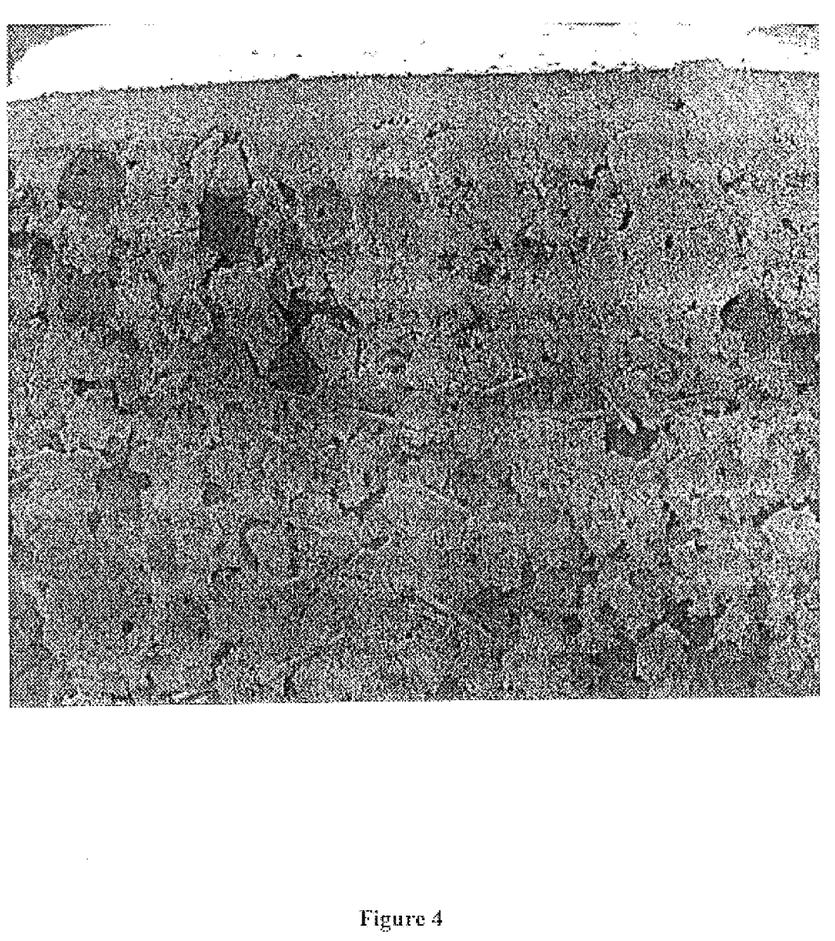
FIG. 4 is 30×photomicrograph of a material made in accordance with the present invention.

The resulting product has a hard dense skin on its outer surfaces, typically less than about 1% to about 2% of the thickness of the formed material. The hard dense skin layer is seen at the top of the photograph in FIG. 4. In the present embodiment, this surface layer is removed from one side of the panel by sanding or other mechanical or chemical processes. In another embodiment, Applicants removed the dense skin prior to hardening of the cementitious material. By removing the dense layer before the cementitious material hardens, eliminates the sanding step and therefore reduces sanding dust accumulation. A finish coating of latex paint or sealer can be applied to reduce dust formation and to provide for a uniform and pleasing color.

Traditional mineral fiber panels are brown to gray in color, due in part to the amounts of mineral fiber and recycled newsprint they contain. Therefore, several layers of pigmented coatings or paint are required to provide a pleasing, white-colored surface while masking the dark substrate. Scratches or other surface abrasions are readily noticeable due to the contrast of color between the white, painted surface and the darker substrate. Cementitious materials however, are available in white colors that require little to no pigmentation in the finish coating to provide a white appearance. The resulting white on white combination produces a through color appearance whenever the surface is scratched.

The resulting formed material produces a cementitious composition with a density between about 10 lbs/ft$^3$ and about 40 lbs/ft$^3$. In an alternative embodiment the panel can have a density between about 15 lbs/ft$^3$ and about 35 lbs/ft$^3$ or between about 20 lbs/ft$^3$ and about 30 lbs/ft$^3$. The material can be prepared as a board or panel, typically about 0.25 inches to about 1.0 inches thick. Such acoustic panels are particularly suited for use as construction panels, wall panels, or ceiling panels.

Figure 3:
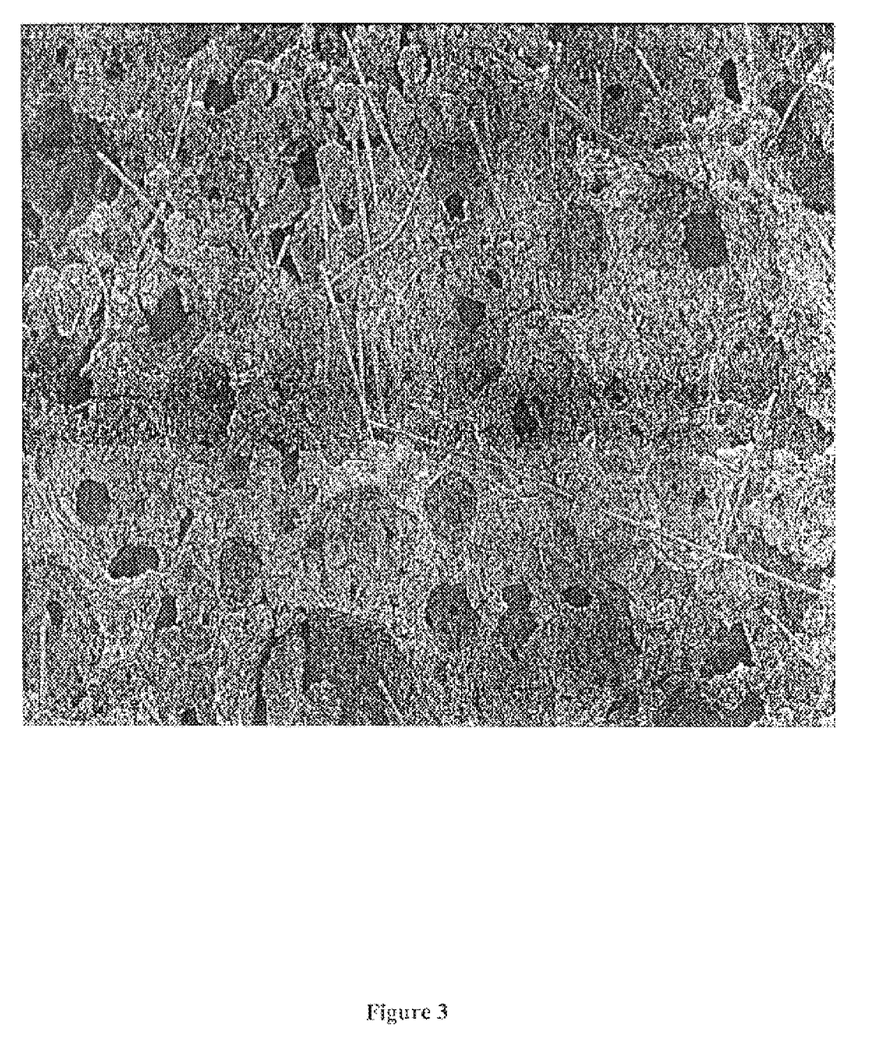
FIG. 3 is 30×photomicrograph of a material made in accordance with the present invention.

The 30×photomicrograph of FIG. 3 shows the fiber and cement matrix, and the open nature of the resulting structure of the material. The material contains pores ranging from approximately 1.5 mm in diameter down to less than about 50 $\mu$m. Most are in the 40 $\mu$m to 200 $\mu$m range. These open pores comprise about 75% to about 95% of the volume of the material.

The reinforcing fibers present in the resulting composition provide tensile strength to the matrix. Throughout the structure, reinforcing fibers pass through the crystalline cement structures and also pass through the pores created by the foaming process.

The finished panel exhibits a high-density boundary layer. This is shown in the 30×photomicrograph of FIG. 4. The high-density boundary layer is approximately 150 $\mu$m to 225 $\mu$m thick and is present on both sides of the panel. It contains few, if any, foam-induced pores, and thus is approximately as dense as cementitious cement without foaming. There is still a relatively small degree of porosity in this boundary layer, created by the micron-size spaces within the crystal matrix. The porosity is very low, however, resulting in a hard, high-density surface layer.

Figure 5:
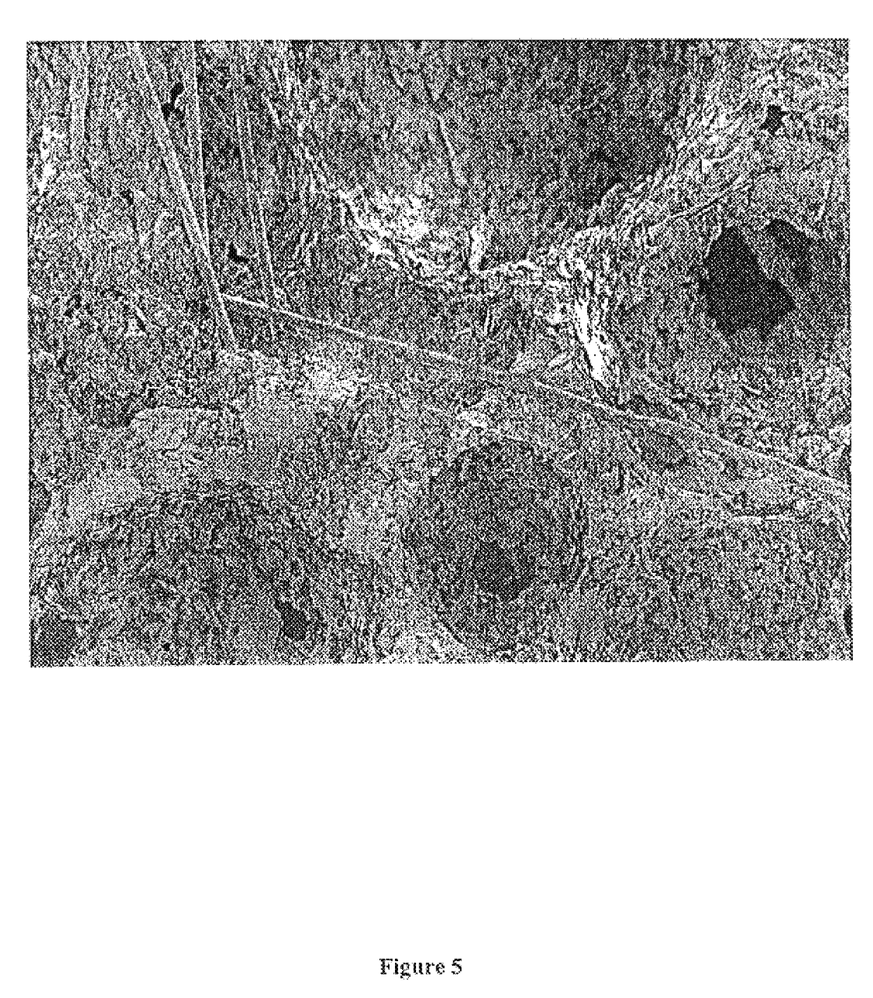
FIG. 5 is a 100×photomicrograph of a material made in accordance with the present invention.

The higher magnification 100×view of FIG. 5 shows the reticulated structure of the matrix. The pores in the composition form a complex reticulated network of small and microscopic tunnels throughout the material. Also clearly seen in this view are pores smaller than 100 $\mu$m to 225 $\mu$m across, interconnected with larger pores in the matrix.

Figure 6:
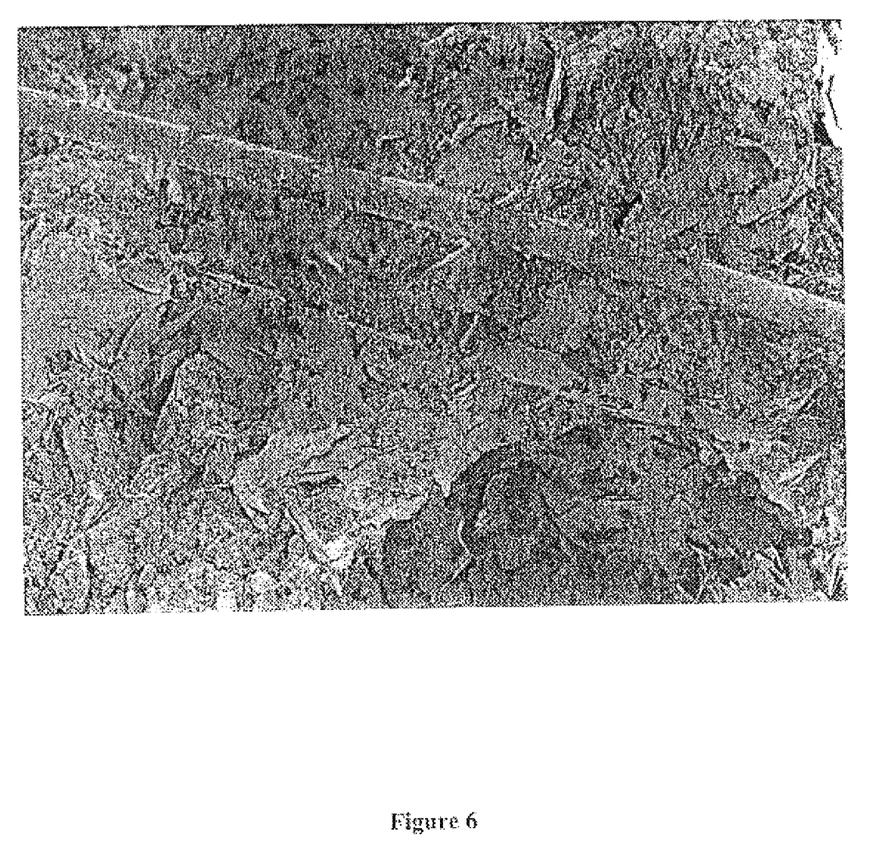
FIG. 6 is a 300×photomicrograph of a material made in accordance with the present invention.

In the microscopic 300×view of FIG. 6, pores as small as a few microns, resulting from spaces between interlocked crystals can be seen. Individual crystalline cement particles can also be seen in this photomicrograph. The cement particles range in size from the lower limit of the photomicrograph's resolution, approximately 1 $\mu$m, to thin, flat structures about 10 $\mu$m to about 50 $\mu$m across, and perhaps less than a micron thick. Other pores, up to about 200 $\mu$m to about 225 $\mu$m across are also seen within the matrix. The larger networks of crystals are formed around the cells of the aqueous foam during manufacture, creating these and the larger pores in the material. The cement crystals bind with each other as water is bound up into the crystals during curing. Chemical bonding between randomly shaped crystals holds the network of large and small crystals seen in FIG. 6 together. The crystals are randomly aligned in this interlinked network. It is this interlocking of crystal structures within the cement and around the polyester fibers that provides excellent durability and strength for panels constructed from the material.

One feature of the composition is the method of combining very few ingredients to create a durable, acoustical, fibrous cementitious structure suitable for fabricating construction panels. Another feature of the composition is durability in combination with a high NRC and STC. And still another feature is a construction panel characterized by a high porosity and distribution of pores through this foamed cementitious structure. Approximately 75% to approximately 95% of the volume of the panel is air.

Removing the high-density boundary layer from one face by sanding or other means, exposes the highly porous structure of the cementitious foam composition, resulting in a highly acoustically absorbent panel. Allowing the high-density boundary layer to remain intact on the reverse face produces a high STC without the need for additional backing material such as foil or an organic coating.

The cementitious material is relatively resistant to moisture. This can be quantified as a value determined from a sag test. The following are approximate four-cycle sag test ranges for various embodiments. Each cycle consists of subjecting the 2 ft by 2 ft sample to 17 hours at 82° F. and 90% RH followed by 6 hours at 82° F. and 35% RH. In one embodiment, at 90% RH there is typically a resulting sag of less than 0.15 inches. In a second embodiment, at 90% RH there is typically a resulting sag of less than 0.1 inches. In a third embodiment at 90% RH there is typically a resulting sag of less than 0.05 inches.

The cured cementitious material can form a construction panel that comprises both high porosity and distribution of pores throughout this foamed cementitious structure with an average pore size of approximately 40 microns to approximately 200 microns. Additionally, the reticulated nature of the matrix within the material is such that most pores are open to other pores, creating numerous pathways through the material for effective sound absorption. The panel has a self-supporting matrix structure comprised of cement, polyester fibers, water and surfactant. No starch or other external binding system is required to hold the components together. Other such binders may be added if so desired, but their inclusion is not necessary since the crystalline cement combined with the polyester fiber forms the strongly bonded primary structure of the formed panels.

While embodiments have been illustrated and described above, it is recognized that variations may be made with respect to features and components of the invention. Therefore, while the invention has been disclosed in various forms only, it will be obvious to those skilled in the art that many additions, deletions and modifications can be made therein without departing from the spirit and scope of this invention, and that no undue limits should be imposed thereon except as set forth in the following claims. For example the type of cement utilized within the formula may vary depending upon desired properties of the material. Additionally, the type, length and diameter of fiber may vary depending upon strength requirements of the end product to be constructed from the panel.

What is claimed is:

1. An acoustically absorbent porous panel comprising:
   a cured aqueous foamed cementitious material comprising on a wet basis about 53% to about 68% by weight cement, about 17% to about 48% by weight water, about 0.05% to about 5% by weight fiber, and about 0.01% to about 10% by weight surfactant; and
   pores distributed within the cured material comprising about 75% to about 95% by volume of the material.

2. The acoustically absorbent porous panel of claim 1, wherein the cured aqueous foamed cementitious material comprises on a wet basis about 54% to about 63% by weight cement, about 32% to about 44% by weight water, about 0.1% to about 3% by weight fiber, and about 0.5% to about 5% by weight surfactant.

3. The acoustically absorbent porous panel of claim 1, wherein the foamed cementitious material also contains about 1% to about 10% by weight of a filler.

4. The acoustically absorbent porous panel of claim 3, wherein the filler is calcium silicate.

5. The acoustically absorbent porous panel of claim 4, wherein the calcium silicate is wollastonite.

6. The acoustically absorbent porous panel of claim 1, wherein the cement is selected from the group consisting of gypsum cement, portland cement, sorrel cement, slag cement, fly ash cement, calcium alumina cement, and mixtures thereof.

7. The acoustically absorbent porous panel of claim 6, wherein the gypsum cement is selected from the group consisting of calcium sulfate alpha hemihydrate and calcium sulfate beta hemihydrate.

8. The acoustically absorbent porous panel of claim 6, wherein the gypsum cement is selected from the group consisting of synthetic calcium sulfate beta hemihydrate and chemically modified calcium sulfate beta hemihydrate.

9. The acoustically absorbent porous panel of claim 1, wherein the surfactant is selected from a group consisting of an amphoteric, anionic, and nonionic moieties.

10. The acoustically absorbent porous panel of claim 9, wherein the surfactant further comprises a moiety selected from the group consisting of a hydrophobic portion containing 8 to 20 carbons.

11. The acoustically absorbent porous panel of claim 9, wherein the surfactant is selected from the group consisting of betaine, sultaine, propionate, sulfate, sulfosuccinate, and amine oxide.

12. The acoustically absorbent porous panel of claim 9, wherein the surfactant is selected from the group consisting of cocamidopropyl betaine, cocamidopropyl hydroxysultaine, cocoamphoproprionate, cocamidopropyl amine oxide, cocamine oxide, lauramine oxide, myristamine oxide, and oleamine oxide.

13. The acoustically absorbent porous panel of claim 1, wherein the surfactant comprises an ethoxylated alkyl phenol.

14. The acoustically absorbent porous panel of claim 1, further including a dense skin comprising less than 2% of total thickness of the panel formed adjacent a surface of the panel.

15. The acoustically absorbent porous panel of claim 14, further including a dense skin comprising less than 2% of total thickness of the panel being formed on both surfaces of the panel.

16. The acoustically absorbent porous panel of claim 1, wherein the panel has a density between about 10 lbs/ft$^3$ and about 40 lbs/ft$^3$.

17. The acoustically absorbent porous panel of claim 16, wherein the panel has a density between about 15 lbs/ft$^3$ and about 35 lbs/ft$^3$.

18. The acoustically absorbent porous panel of claim 17, wherein the panel has a density between about 20 lbs/ft$^3$ and about 30 lbs/ft$^3$.

19. The acoustically absorbent porous panel of claim 1, wherein an average diameter of the pores is between about 1.5 mm and about 50 μm.

20. The acoustically absorbent porous panel of claim 19, wherein the pores have an average size from about 40 μm to about 200 μm, and are open to other pores creating pathways through the cementitious material whereby sound can be effectively absorbed.

21. The acoustically absorbent porous panel of claim 1, wherein the fibers are from about 0.25 inches to about 0.75 inches in length and between about 0.0005 inches to about 0.007 inches in diameter.

22. The acoustically absorbent porous panel of claim 1, wherein the fibers are synthetic organic fibers selected from the group consisting of polyester, polyamide, and polyolefin.

23. The acoustically absorbent porous panel of claim 22, wherein the polyester fibers are polyethylene terephthalate fibers.

24. The acoustically absorbent porous panel of claim 1, wherein the fibers are crimped.

25. The acoustically absorbent porous panel of claim 1, wherein the panel is an acoustic ceiling tile.

26. The acoustically absorbent porous panel of claim 1, wherein the Noise Reduction Coefficient of the panel is at least 0.5.

27. The acoustically absorbent porous panel of claim 26, wherein the Noise Reduction Coefficient of the panel is at least 0.7.

28. The acoustically absorbent porous panel of claim 1, wherein the range for the Sound Transmission Coefficient is between about 30 to about 40.

29. The acoustically absorbent porous panel of claim 1, wherein the cured foamed cementitious material comprises on a wet basis about 56% to about 61% by weight cement, about 32% to about 42% by weight water, about 0.28% to about 1.3% by weight fiber, and about 0.7% to about 2% by weight surfactant.

30. A process for producing an acoustically absorbent porous panel comprising:
aerating a foam slurry comprised of between about 53% to about 68% by weight cement, between about 17% to about 48% by weight water, between about 0.05% to about 5% by weight fibers and between about 0.01% to about 10% by weight surfactant; and
drying the aerated foam slurry.

31. The process of claim 30, wherein the slurry further comprises between about 1% to about 10% by weight of filler.

32. The process of claim 31, wherein the filler is calcium silicate.

33. The process of claim 30, wherein the cement is gypsum cement.

34. The process of claim 30, further comprising dry mixing the cement, filler and fibers to form a dry mix.

35. The process of claim 34, further comprising aqueous mixing the water and surfactant to create a diluted surfactant solution.

36. The process of claim 35, wherein the dry mix and the diluted surfactant solution are combined to form the foam slurry.

37. The process of claim 30, further including the step of applying an organic coating to a facing side of the panel.

38. The process of claim 35, wherein the temperature of the diluted surfactant solution is between about 41° F. to about 168° F.

39. The process of claim 38, wherein the temperature of the diluted surfactant solution is between about 68° F. to about 92° F.

40. The process of claim 30, wherein the thickness of the panel is between about 0.25 inch to about 1 inch.

41. An acoustically absorbent porous panel comprising cementitious material, the cementitious material comprising cement, fibers and surfactant, the cementitious material having a density between about 10 lb/ft$^3$ and about 40 lb/ft$^3$, a scratch resistance test result of at least 12, an indent of less than 0.12 inches, a Noise Reduction Coefficient of at least 0.5, and a sag test result of less than 0.15 inches at 90% RH.

42. The acoustically absorbent porous panel of claim 41, wherein the density of the panel is between about 15 lb/ft$^3$ and about 35 lb/ft$^3$.

43. The acoustically absorbent porous panel of claim 41, wherein the panel has a scratch resistance test result of at least 18.

44. The acoustically absorbent porous panel of claim 41, wherein the panel having an indent of less than 0.10 inches.

45. The acoustically absorbent porous panel of claim 41, wherein the panel has a Noise Reduction Coefficient is at least 0.7.

46. The acoustically absorbent porous panel of claim 41, wherein the panel has a sag test result of less than 0.1 inches at 90% RH.

47. The acoustically absorbent porous panel of claim 41, wherein the panel can be cut with conventional utility knife.

48. The acoustically absorbent porous panel of claim 41, wherein the moisture content of the panel is less than 5% by weight water.

49. The acoustically absorbent porous panel of claim 41, wherein the comprises at least 90% by weight of the porous panel.

50. An acoustically absorbent porous panel comprising at least 90% by weight of a gypsum cement and having a Noise Reduction Coefficient of at least 0.5.

51. The acoustically absorbent porous panel of claim 50, wherein the Noise Reduction Coefficient is at least 0.6.

52. The acoustically absorbent porous panel of claim 51, wherein the Noise Reduction Coefficient is at least 0.7.

53. The acoustically absorbent porous panel of claim 50, wherein the panel comprises at least 95% by weight of a gypsum cement.

54. The acoustically absorbent porous panel of claim 50, wherein the density of the panel is between about 10 lb/ft$^3$ and about 40 lb/ft$^3$.

55. The acoustically absorbent porous panel of claim 54, wherein the density of the panel is between about 15 lb/ft$^3$ and about 35 lb/ft$^3$.

56. The acoustically absorbent porous panel of claim 55, wherein the density of the panel is between about 25 lb/ft$^3$ and about 30 lb/ft$^3$.

57. An acoustically absorbent porous panel comprising at least 90% by weight of a gypsum cement and having a density between about 10 lb/ft$^3$ and about 40 lb/ft$^3$.

58. The acoustically absorbent porous panel of claim 57, wherein the density of the panel is between about 15 lb/ft$^3$ and about 35 lb/ft$^3$.

59. The acoustically absorbent porous panel of claim 58, wherein the density of the panel is between about 25 lb/ft$^3$ and about 30 lb/ft$^3$.

60. An acoustically absorbent porous panel comprising a substantially compositionally homogenous cementitious material, the compositionally homogenous material comprising a cement, fiber and surfactant, the panel having two opposed surfaces, a surface portion adjacent one of the opposed surfaces having a first density, a center portion at the center of the panel between the two opposed surfaces having a second density, the first density being substantially greater than the second density.

* * * * *